United States Patent [19]

Malek

[11] Patent Number: 4,829,517
[45] Date of Patent: May 9, 1989

[54] CIRCUIT ARRANGEMENT FOR INJECTING METER PULSES FOR SUBSCRIBER TARIFF COUNTING

[75] Inventor: Moni Malek, Munich, Fed. Rep. of Germany

[73] Assignee: Siemens Aktiengesellschaft, Berlin and Munich, Fed. Rep. of Germany

[21] Appl. No.: 85,503

[22] Filed: Aug. 14, 1987

[30] Foreign Application Priority Data

Sep. 12, 1986 [DE] Fed. Rep. of Germany ....... 3631175

[51] Int. Cl.$^4$ .............................................. H04J 3/12
[52] U.S. Cl. ................................. 370/110.1; 379/124
[58] Field of Search ............... 379/124, 125, 126, 127, 379/128; 370/100, 110.1

[56] References Cited

U.S. PATENT DOCUMENTS

| | | | |
|---|---|---|---|
| 3,573,378 | 4/1968 | Leyburn | 379/124 |
| 3,936,608 | 2/1976 | Danielsen | 379/125 |
| 4,356,352 | 10/1982 | Hilliges | 379/128 |

Primary Examiner—Robert L. Griffin
Assistant Examiner—Frank M. Scutch, III
Attorney, Agent, or Firm—Adel A. Ahmed

[57] ABSTRACT

For subscriber termination circuits of a digital time multiplex telecommunications system comprised in a group, an injection circuit is provided, individual to a group. The injection circuit comprises a switch exhibiting a gradual change of state both in switching on and switching off for providing timing for meter pulses provided by a meter pulse generator. The meter pulses are applied to the individual subscriber termination lines in a multiplex manner by way of contacts as well as test relays already present.

3 Claims, 1 Drawing Sheet

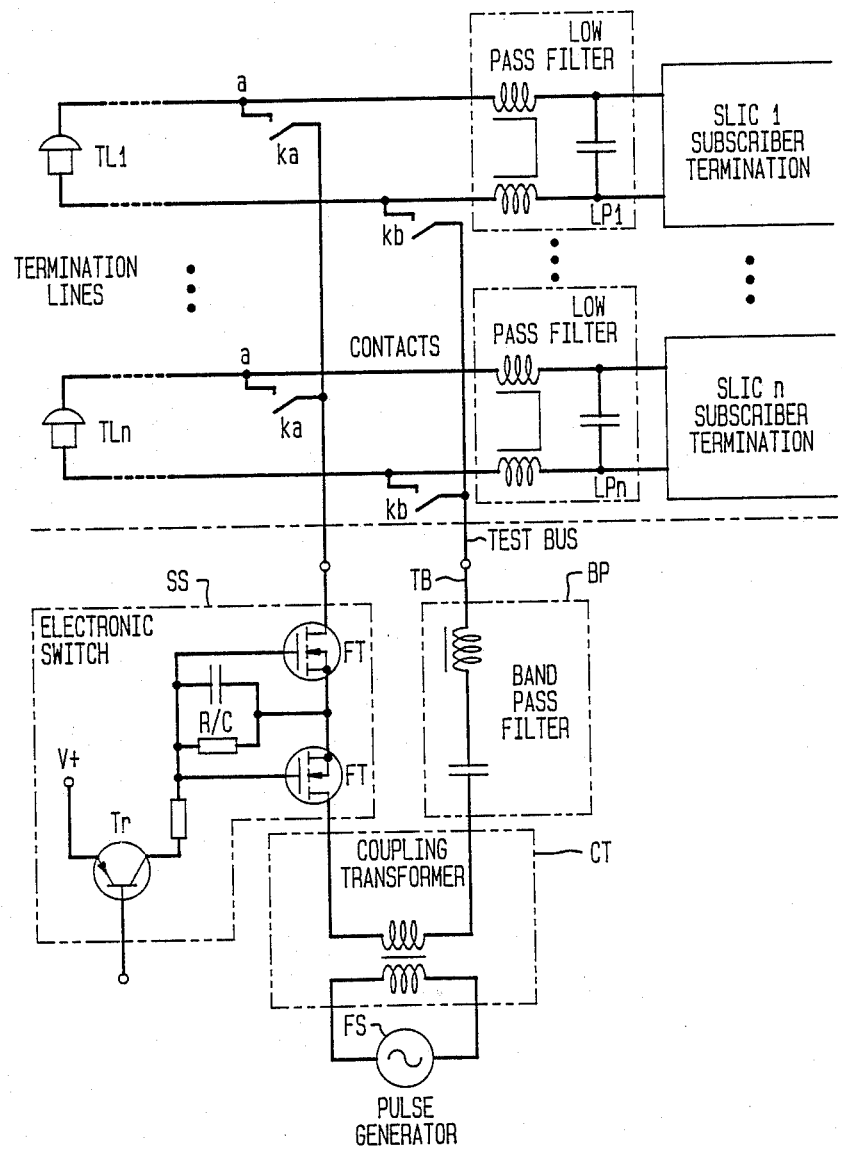

CIRCUIT ARRANGEMENT FOR INJECTING METER PULSES FOR SUBSCRIBER TARIFF COUNTING

FIELD OF THE INVENTION

The present invention relates to a circuit arrangement for injecting meter pulses for subscriber tariff counting into subscriber termination lines of a digital time multiplex switching system which are coupled to a subscriber termination circuits comprised in a module and which may be coupled to a test bus line, individual to a line, by way of test relays for carrying out line tests.

BACKGROUND OF THE INVENTION

Tariff pulses having a frequency outside the telephone band of 300 Hz to 3400 Hz, preferably 16kHz, are generated at a central point and are injected in the subscriber termination circuits on the subscriber termination lines for tariff subscriber counting in digital time multiplex telephone switching systems. Such injection takes place at a tariff clock rated dependent on the respective time zone of the circuit to be evaluated. Corresponding counting and display of the tariff pulses then takes place in the subscriber station.

Prior art utilized elaborate circuitry, individual to a line, including two tuned filter circuits and two coupling transformers for injecting tariff pulses. Injection of tariff pulses into individual subscriber termination lines took place independently.

SUMMARY OF THE INVENTION

An aspect of the invention is the reduction of the elaborate circuitry.

In accordance with an embodiment of the invention, a circuit arrangement for injecting meter pulses is characterized in that it includes, individual to a line, only low pass filter circuits having a pass band in the telephone frequency range for coupling subscriber termination lines with a respective subscriber termination circuit, and as a component individual to a group, an injection circuit coupled to the test bus and a coupling transformer whereof the primary winding is coupled to a meter pulse generator and, in the secondary circuit of the coupling transformer which is coupled to the test bus, a bandpass filter for passing the meter pulse frequency, and further including, also in the secondary of the coupling transformer, an electronic switch which, both on opening and on closing switches over gradually into the other switching state and in that the test relays associated with the subscriber line are utilized for injecting the tarrif pulses and are thereby operated in succession, and in that a closing of the electronic switch always takes place following actuation of a test relay and an opening always takes place before the deactuation thereof.

In accordance with the invention, a central circuit portion is provided for serving the individual subscriber termination lines with the test relays, individual to a line, being in multiplex operation. In accordance with the invention, as a result of the predetermined sequence of operation of the relays and of the electronic switch and as a result of its properties, the connection of the meter pulse source takes place in a click-free manner. The coupling transformer prevents the test bus from being influenced in an unreliable manner by the above-mentioned circuit portion individual to a group due to the finite blocking attenuation of the electronic switch.

On the other hand the speech signals carried on the subscriber termination lines are prevented from being attenuated by this circuit in an unreliable manner by means of the band pass provided in accordance with the invention.

Finally, the meter pulses are prevented from influencing the subscriber termination circuit by the low pass filter individual to a line. Attenuation of speech signals by this filter circuit is negligible. In contrast with prior art solutions, such a filter does not need to be adjusted exactly to the line conditions.

In accordance with a further embodiment, field effect transistors are utilized for realizing the electronic switch providing a gradual transition between switching conditions.

In the following, the invention will be more fully described with the aid of a FIGURE.

BRIEF DESCRIPTION OF THE DRAWING

The FIGURE shows in the portion above the dashed line subscriber termination lines TL1 and TLn with appurtenant subscriber termination circuits SLIC 1 and SLIC n which belong to a group of n, preferably eight subscriber termination lines, or correspondingly, subscriber termination circuits.

DESCRIPTION OF THE PREFERRED EMBODIMENT

Connection of the subscriber termination lines takes place in each instance by way of a low pass filter Lp1, or correspondingly, Lpn, which exhibits a high attenuation for signals having a frequency above the telephone band of 300 Hz to 3400 Hz.

Conductors a and b of the subscriber termination lines are coupled by way of contacts ka and kb of test relays individual to a line to a two-conductor test bus TB combined with the group of subscriber lines. The further continuation of the test bus with devices from which test signals are injected by way of these contacts, or correspondingly, from which measurements can be undertaken, are not shown here.

The portion individual to a group of the circuit arrangement in accordance with the invention is shown in the FIGURE below the horizontal dashed line.

This circuit portion, coupled to test bus TB, includes a coupling transformer CT having a meter pulse generator FS at its primary which generates meter pulses of e.g. 16 kHz or 12 kHz. The secondary circuit of this coupling transformer which is coupled to the test bus includes as a further component of this circuit arrangement individual to a group a band pass filter BP which passes the meter pulses provided by pulse generator FS. Also included in this secondary circuit of the coupling transformer as a further component of the circuit arrangement in accordance with the invention is an electronic switch SS for generating the tariff clock rate which transitions gradually into the other state both on closing and opening. In the described embodiment, this electronic switch comprises two field effect transistors FT having their main conduction paths coupled in series, their control electrodes coupled together and further coupled by way of an RC network RC with the joined main electrodes as well as a bipolar transistor Tr having a main conduction path over which the control current for the field effect transistors is supplied and having a base electrode to which the control pulses for the electronic switch are supplied.

The above-described circuit arrangement, individual to a group, is assigned to the individual subscriber termination circuits in multiplex operation on account of corresponding control of relay contacts ka and kb in other than test operation for which these are originally provided. In accordance with the invention, the switch operation is such that connection to a particular subscriber termination circuit by closing of contacts ka, kb takes place first and then electronic switch SS is closed and following thereafter is again opened so as to couple the meter pulses provided by the meter pulse generator into the corresponding subscriber termination line TL and such that separation of the meter pulse generator from the subscriber termination line by opening of contacts ka and kb only takes place when the electronic switch is again open. Thereafter, the same sequence repeats itself in relation to a following subscriber termination line participating in a connection. A group processor, not shown, primarily responsible for control of the subscriber termination circuits and of a group coupler, processing received selection information, carrying out routine checks and monitoring functions can control this whole switching operation.

Control can also take place such that contacts ka and kb remain closed between operations of the electronic switch when only one of the subscriber termination lines is participating in a connection.

The band pass filter provided in accordance with the invention prevents attenuation of the speech signal on the subscriber termination line by the circuit individual to the group. It further prevents possible interfering frequencies from the meter pulse generator from reaching the subscriber termination lines.

Coupling of meter pulses into the subscriber termination lines takes place without clicks, because of the characteristics of the electronic switch realized with field effect transistors FT.

As has been indicated, low pass filters LP1 through LPn prevent meter pulses from affecting subscriber termination circuits SLIC 1 through SLIC n. They further prevent uninvolved subscriber termination lines from being impaired by inductive coupling associated with the coupling of meter pulses.

What is claimed is:

1. A circuit arrangement for injecting meter pulses for subscriber tariff counting into subscriber termination lines of a digital time multiplex switching system coupled to subscriber termination circuits comprised in a module, and which may be coupled by way of test relays, individually associated with a respective line, to a test bus line, individually associated with a respective group, for conducting line tests, said circuit arrangement comprising:

as components individually associated with a respective line, only telephone speech frequency low pass filter means for coupling subscriber termination lines to respective subscriber termination circuits and, as components individually associated with a respective group, injection circuit means coupled to said test bus and coupling transformer means whereof a primary winding is coupled to a generator of meter pulses, and bandpass filter means for passing frequencies of said meter pulses coupled to a secondary winding of said coupling transformer means, said secondary winding being further coupled to said test bus, and electronic switch means serially coupled to said secondary winding for providing meter pulse clocking, said electronic switch means exhibiting a gradual transition into the other condition both on opening and on closing, said circuit arrangement further comprising said test relays associated with said subscriber termination lines being utilized for injecting said meter pulses and being actuated in succession and a closing of said electronic switch means always occurring following actuation of a test relay and an opening of said electronic switch means always occurring before a deactuation of a test relay.

2. A circuit arrangement as recited in claim 1 wherein said electronic switch means comprises a pair of field effect transistors whereof the principal conduction paths are coupled in series in circuit with said secondary winding of said coupling transformer means and whereof the control electrodes are joined together and are coupled by way of an RC element to the joined main electrodes of said field effect transistors, said circuit arrangement further including a bipolar transistor having a main conduction path, a control current for said field effect transistors being provided by way of said main conduction path, said bipolar transistor including a base electrode whereat control pulses for said electronic switch means are provided.

3. A circuit arrangement as recited in claim 2 wherein said field effect transistors are enhancement type MOS field effect transistors wherein the substrate is respectively coupled to a main electrode.

* * * * *